United States Patent [19]
Galantine et al.

[11] 4,062,716
[45] Dec. 13, 1977

[54] APPARATUS FOR PROGRAMMING THE DEPOSITION OF MATERIAL ON A TIRE SURFACE

[75] Inventors: Raymond M. Galantine, Newport Beach; Bruce G. Brown, Corona, both of Calif.

[73] Assignee: AMF Incorporated, White Plains, N.Y.

[21] Appl. No.: 763,190

[22] Filed: Jan. 27, 1977

Related U.S. Application Data

[63] Continuation-in-part of Ser. No. 598,109, July 22, 1975, abandoned, which is a continuation-in-part of Ser. No. 454,651, March 25, 1974, abandoned.

[51] Int. Cl.² .......................................... B29H 17/36
[52] U.S. Cl. .................................. 156/361; 74/3.52; 156/130; 156/397; 242/DIG. 1
[58] Field of Search ............... 156/117, 130, 350, 358, 156/361, 367, 397, 408; 74/3.52; 242/DIG. 1, 158 B, 158 R

[56] References Cited

U.S. PATENT DOCUMENTS

| | | | |
|---|---|---|---|
| 3,251,722 | 5/1966 | Holman | 156/130 |
| 3,264,162 | 8/1966 | Holman | 156/117 |
| 3,268,380 | 8/1966 | Guichon et al. | 156/117 |
| 3,308,000 | 3/1967 | Holman | 156/130 |
| 3,843,482 | 10/1974 | Wireman et al. | 156/130 |

*Primary Examiner*—Charles E. Van Horn
*Assistant Examiner*—John E. Kittle
*Attorney, Agent, or Firm*—George W. Price; Walter Lewis

[57] ABSTRACT

A programming apparatus for use with a machine applying successive wraps of rubber on a tire surface during a retreading operation. The contour of the layers to be deposited is translated upon a template device by positioning of select metallic contacts. In turn, the number of wraps for a given arcuate distance are more finely defined upon a second template device. The second template being indexed with a series of metallic contacts. The entire operation is controlled electrically such that successive movement of the tire surface is correlated to arcuate distance.

8 Claims, 6 Drawing Figures

APPARATUS FOR PROGRAMMING THE DEPOSITION OF MATERIAL ON A TIRE SURFACE

The present invention is a continuation-in-part of our copending continuation-in-part application Ser. No. 598,109 filed July 22, 1975 entitled "Method and Apparatus for Programming the Deposition of Material on a Tire Surface," now abandoned, which, in turn, is a continuation-in-part of abandoned application U.S. Ser. No. 454,651 filed Mar. 25, 1974.

This invention is directed to an apparatus for use with an assembly employed in the application of elastomeric material onto a tire surface. More particularly, the present invention is directed to a new and novel apparatus and method for programming the application of such material onto such tire surface so as to, for example, retread a tire with fresh tread material.

The use of various mechanical, electrical and electromechanical systems for programming the deposition of elastomeric material during the retreading operation is known. In this connection, it is desirable to control the rate of deposition, overlap of adjacent layers of material and ultimate tread contour across the entire surface of the tire having known characteristics. Systems for accomplishing such steps can be quite complex, very expensive and difficult to operate. Obviously, it is desirable to employ an apparatus and method for achieving such results at a minimum of expenditure, set-up time, as well as ease of operation.

Furthermore, in the process of effecting such results, it is essential that the programming function exhibit repeatability within an established parameter.

Zone programming is used in the present invention and explained in prior art, for example, U.S. Pat. No. 3,264,162 has a major advantage of being easily programmed so that the many programs used in a retread shop; sometimes as many as 200, can be programmed in a reasonable length of time. However, the inherent difficulty with any zone system, particularly when used in the production of tire surfaces, is that the slightest variation in steps can result in the addition or loss of wraps on the finished tire, thereby changing the contour of the as built tire. These changes can cause product quality problems as well as the use of more rubber than is necessary to produce a good product. A further disadvantage of the zone programming system is that it is based on time, with the result that errors can be introduced into the program because of component temperature, sensitivity, and drift characteristics in the electrical circuits. Still a further disadvantage is the fact that the operator must adjust numerous dials for each program change. Any incorrect settings by the operator will, of course, result in tires which are incorrectly built.

A second approach for controlling a rubber ribbon winding system employed in the building of tires is the incremental system. In this system each step or motion of the tire is individually specified. A major advantage to this system is that it is sensitive to position, with the result that error due to component drift or temperature sensitivity does not affect the end product. Further, since each step is specified, errors in individual steps cannot result in the adding or subtracting of a wrap, which results in inconsistent tire building. The major disadvantage of this system is that each individual wrap has to be programmed and specified; an operation that is quite time consuming since time is required for programming each program, and since small changes in the program necessitate a complete change in the specification of the program.

Accordingly, it is the main object of the present invention to provide a method and apparatus for use with a tire retreading assembly capable of minimizing the defects of the prior art.

Still another object of the present invention is to provide a programmer which is compatible with existing retreading equipment while at the same time exhibiting a high degree of efficiency.

A further object of the present invention is to provide a method and apparatus employing a zoned programmed template having associated therewith a series of positions for transference to a separate incrementally operated production template defining the contour of the elastomeric material ultimately deposited on a carcass surface.

The principle features of the present invention are directed to a zoned programming assembly for use with a tire retread apparatus employing a production template adapted to incrementally control the wraps of advancing rubber ribbon material as it is applied upon a tire surface, tire support means provided with spindle means for receiving a tire thereon, drive means for driving said spindle means through a linkage means connected between said drive means and said spindle means wherein: said linkage means being movable in a first mode in response to zoned program information set forth on a program template through a series of targets positioned in arcuate paths, the distance between each of said targets corresponding to a zone of said tire surface to be wrapped with rubber ribbon, to thusly define the ribbon wrap formation across the entire tire tread surface; a first sensing means mounted on a movable support means within said tire retread apparatus, adapted to travel in concert within a prescribed arcuate relationship with said linkage means, whereby actuation of said sensing means with each of said targets causes corresponding arcuate movement of said tire surface; second sensing means mounted in proximity to said first sensing means on said support means being engageable therewith, through actuation of switch means after the last of said targets in said program template has been sensed; said first and second sensing means being jointly movable in response to a plurality of contacts disposed in a predefined arcuate fashion about an incrementally divided production template, enabling said programming assembly to function with information transferred from said program template to said linkage means for incrementally controlling the arcuate movement of said tire surface in response to said information, and means for de-energizing said spindle after all of said contacts on said production template have been sensed.

Also within the scope of the present invention is an apparatus using, one at a time, each of a pair of templates, comprising a zoned program template and an incremental production template. Each of the templates are respectively employed for ultimately providing for definite deposition of rubber ribbon upon a tire surface moving in an arcuate direction. The program template being employed to ascertain the zones of said tire surface to be wrapped in response to electrical sensing means sensing a plurality of targets mounted in arcuate concentric paths where each of paths correspond to a portion of the tire surface to receive rubber ribbon. The production template, in turn, being defined by an indexed arcuate scale adapted to receive thereon information transferred from the program template, whereby the position of contacts on said second template define the final tire surface profile to be formed through the incremental movement of the tire surface in accordance with position of contacts on the production template.

Further objects and advantages of the present invention will be more readily understood with respect to the accompanying specification and claims, reference thereto being made with respect to the following drawings.

IN THE DRAWINGS

In accordance with the present invention, the automatic machine assembly is adapted to apply extruded tread rubber to a tire surface. Such apparatus is generally known to the art and is exemplified by the teaching in U.S. Pat. Nos. 3,251,722; 3,268,350; 3,177,918; 3,223,572.

During operation, the extruded rubber in the form of a ribbon is caused to be wound around a tire casing continuously, and the thickness of the tread to be formed is determined by the amount of overlap of adjacent layers of abutting strip. In this operation, the overlap of the strip is governed by an electromechanical system provided with predisposed sensing means that is caused to function in accordance with a program template. In its simplistic form, each program template varies from one to another and identifies a specific tread design for a given particular tire contour.

BACKGROUND

Figure 4:
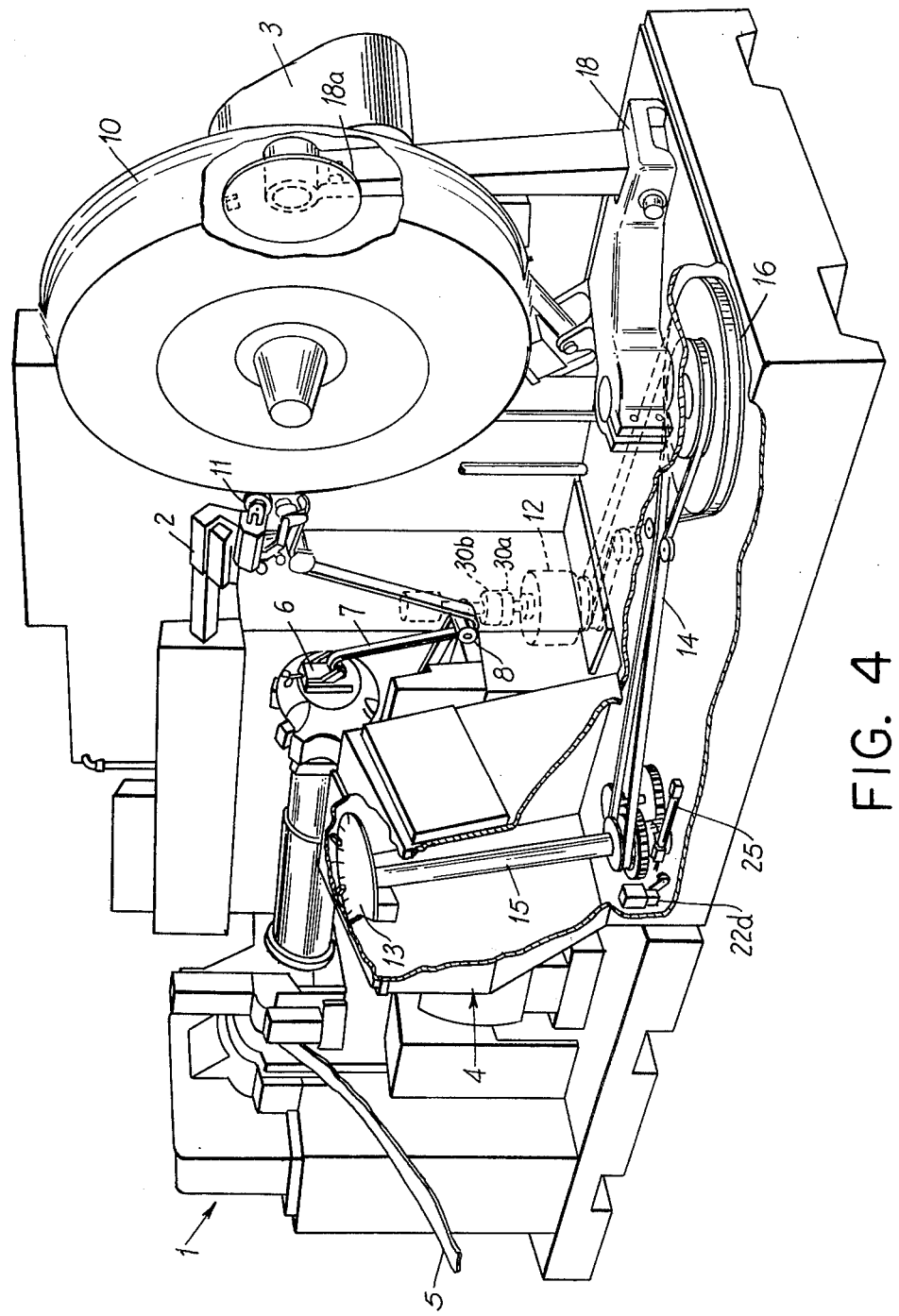
FIG. 4 is a perspective representation in part, of the invention as part of the tire retread apparatus.

To better understand the present invention, one must recognize that the major components of such an apparatus are defined in terms of four basic subassemblies. According to FIG. 4, they are: extruder 1, a ribbon applicator assembly 2, a tire mounting hub and drive assembly 3 and a programmer assembly 4. In operation, rubber is fed into the extruder from a source of supply 5 and is forced through a die 6, disposed at the end of the extruder 1. The rubber 7 extruded under the urging of an extruder screw (not shown) is caused to be passed under a dancer arm roller 8 which is disposed between a pair of rollers used to monitor the thickness of ribbon being fed and deposited on a tire casing 10. Such rubber 7, in turn, is pressed firmly and evenly onto the casing 10 by a plurality of rollers 11 on the applicator assembly 2 simultaneously with the spinning of the casing 10. In turn, the casing 10 is caused to be moved about the applicator assembly 2 in response to a predetermined program which is designed to govern the degree and amount of overlap by the adjacent layers of ribbon 7. It is with this aspect of the overall operation that the present invention is concerned. Lastly, when the application of rubber 7 is completed, the casing 10 ceases to spin, and is caused to move to a zero position. At this point, the operator removes the casing 10, mounts a fresh one and repeats the cycle.

The programming cycle makes use of two templates 13, 20 during the program mode of operation. Afterwards, during the production cycle where wrapping takes place only a single template 13 is employed. During programming, the operator programs the machine by means of the zone method of programming so as to achieve the advantages and efficiency mentioned thereinbefore. The zone method is intended to refer to a basis of programming by which the tire is divided up into a plurality of zones. For an example, five or more zones define the areas for the number of wraps of elastomeric material layed down in each of these zones. This is a function of the distance over which the tire is moved during each rotation of the tire within a given zone. Some of the characteristics of such zone programming includes the fact that each zone is independent of its neighboring zone and the number of wraps per zone may be altered without adversely affecting that which is carried out in the other zones. Obviously, if it is necessary to program the wrap layers on a wrap-by-wrap basis, such an operation becomes quite time consuming and furthermore, every wrap affects every other wrap that follows it. In other words, if a wrap is subtracted or added from the early protion of the build-up, it would follow that every subsequent wrap must be advanced or reprogrammed to compensate for this differential.

PREFERRED EMBODIMENT

Figure 1:
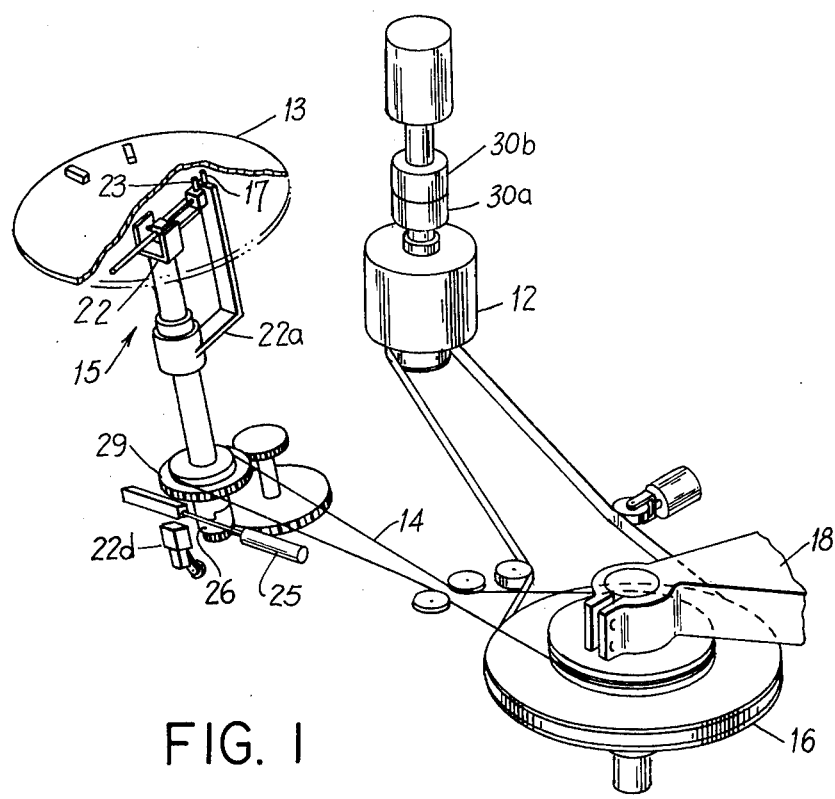
FIG. 1 is a partial schematic view of the programmer and drive assembly.
Figure 2:
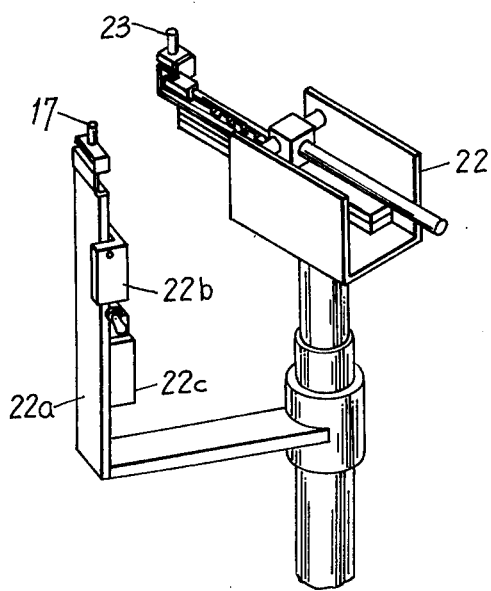
FIG. 2 is an enlarged fragmentary, partial view of the programmer and drive assembly of FIG. 1 in the program mode.
Figure 3:
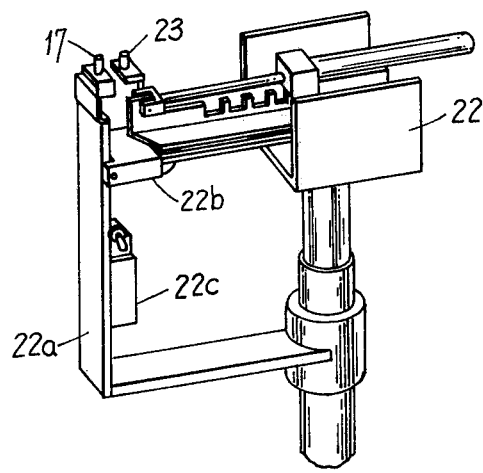
FIG. 3 is another view of FIG. 2, but in the production mode.

In actual practice, the two templates 13 and 20 are disc shaped, transparent members, i.e. plastic, which are mountable one at a time as required in a recessed groove (not shown) for positioning in the upper portion of the console of programmer assembly 4. Template 20 is the program template and template 13 is the production template. As schematically shown in FIG. 1, the templates 13, 20 are employed separately, one at a time, and are positioned above sensors 17, 23 which forms part of assembly 15 disposed within the interior portion of the console of programmer assembly 4. FIGS. 2 and 3 illustrate these elements in more detail. The program template 20 is initially employed, after which a permanent template 13 is formed as a result of the transference of information from programming template 20, as will be explained in more detail hereinafter.

In arriving at the final production program, a number of essential criteria are integrated to form the program for a given application. For an example, such factors may consist of: (a) selecting the proper winding radius, ribbon dimensions, azimuth speed and number of passes (b) determination of the location of six zone targets (to be discussed hereinafter) on the programmer and (c) selecting the proper distances between various tire surface contour features. Obviously, the location of various targets in accordance with specific criteria, vary with each particular size of die employed in the manufacture of tires. It follows, that because tire casings from different manufacturers vary, the dimensions of the matrix are caused to be the criteria for the program.

The apparatus also includes an azimuth drive system 12 which serves to position the tire 10 in accordance with a template 13 (see FIG. 1) installed in the apparatus. In turn, a system of cables 14 drive the program assembly 15 from an azimuth arm pulley 16. A program zone sensor 17 is provided having a 2:1 relationship to the motion of the azimuth arm 18; that is, for each degree that the azimuth arm 18 moves, the sensor 17 moves two degrees. The scale 19 on the programming template 20 (see FIG. 5) is marked to conform with tire motion governed by the azimuth arm 18 and not as in the case of a protractor. According to the invention, a stepper sensor arm 22 moves twenty degrees for each degree of tire movement during the program mode.

As used in the present invention, the sensors are intended to include proximity switches which are designed to respond to a piece of information, such as a movable metallic target on a template. The logic circuitry as employed herein, does not form part of the invention; however, it is designed to respond to signals generated by stepper sensor 23 and zone sensor 17.

In operation, the motion of the tire casing 10 is halted when the stepper sensor 23 detects a metallic referencing point 24 (see FIG. 5) on template 20. A pneumatic cylinder 25 and clutch assembly 26 are included as part of the programmer assembly 15 and serves to reset the stepper sensor 23 to zero. During the production cycle, that is the actual manufacture of tires, the stepper sensor 23 is latched together with the zone sensor 17 (see FIG. 3) whereas, the stepper sensor 23 operates independently only in the programming mode (see FIG. 2).

By mechanically linking zone advance arm 22a and program stepper arm 22 by means of a sensor latch 22b shown in (FIG. 2 and 3), the respective sensors 17, 23 are caused to move in concert with one another at a ratio of 2:1 to the azimuth arm 18. The mechanical linking referred to above actuates a microswitch 22c in the programmer assembly 15, which, in turn, alters the logic of the control circuits enabling the signal from the zone sensor 17 to cause clutch 30b to disengage and brake 30a to engage. What follows is that the advance of azimuth arm 18 is stopped. After one rotation of tire 10, a spin switch 18a is actuated which disengages the azimuth brake 30a and engages an azimuth clutch 30b to advance the zone sensor 17 until it senses the presence of the next contact on the production template 13. This procedure repeats itself until the last metallic strip 28 is sensed by the stepper switch 23. The function of the stepper switch 23 in the production mode is such, that the signal generated by the proximity of the last metallic strip 28 is sensed by the stepper switch 23. The function of the stepper switch 23 in the production mode is such, that the signal generated by the proximity of the last metallic strip 28 on the production template 13 with respect to stepper switch 23 activates the end of program logic.

PROGRAMMING

In order to translate the locations of the zones from programming template 20, movable targets 27 are employed which are adapted to function in conjunction with sensors 17, 23 mounted on the zone advance arm 22a and the stepper sensor arm 22. By advancing the movable targets 24, 27 it is possible to program the machine operation. The locations of the zone targets 27 are identified on the outer scale of a programming template 20 which, in turn, determine the critical change points for programming. For an example, a tire surface to be wrapped with rubber is identified as having: a first wing, shoulder, and crown location and a second wing and shoulder disposed to the other side of the crown location. In turn, six zone targets 27 define wrap starting points and transitional buildup points, i.e., determination of the start of shoulder build-up which, in turn, defines the crown width.

Figure 5:
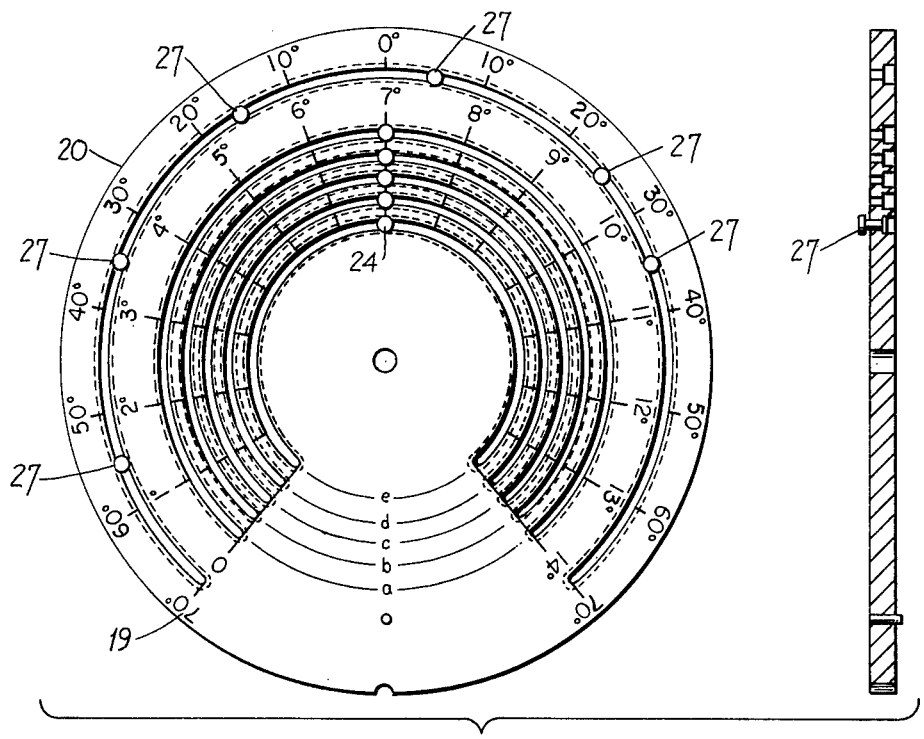
FIG. 5 is a front view of a program template.

Referring to FIG. 5 the outside path adjacent to scale 19 is provided with six movable targets 27. Targets 24 are each disposed within five inner grooves a, b, c, d, e, while each of such grooves represents one of the zones of the tire. The setting of movable targets 24 within the inner five circles represents the distance that the tire is stepped while it is in each of the zones. Sensor 23 on stepper sensor arm 22 is actuated by the targets 24 in the zone grooves a, b, c, d, e.

More particularly, the five inner scales in FIG. 5 are designated as stepper scales and are the means designed to expand the motion of the azimuth arm 18 by a factor of 20. The sensor 23 is caused to rotate 20° for every degree that the azimuth arm 18 rotates. The scales a, b, c, d, e, are marked to indicate how many degrees the azimuth arm 18 rotates. During the programming operation, the tire 10 is caused to be moved in a clockwise direction on the azimuth arm 18 and the zone advance arm 22 acting through a cable 14 attached through a gearing assembly 29 is driven at a 2 to 1 ratio. The zone advance arm 22 moves clockwise until the first zone target 27 is sensed. This signal stops the tire azimuth motion and the tire 10 rotates to a start position.

In continuing the programming operation, the operator next applies rubber to the tire 10 as the applicator assembly 2 is manually extended. Next, the operator presses a start button and the screw of extruder 1 and tire 10 are both caused to rotate. After one rotation of the tire 10, a spin switch 18a is actuated which disengages the azimuth brake 30a and engages an azimuth clutch 30b to advance the zone advance arm 22a along the template 20. The motion also advances the stepper sensor arm 22 along the template 20 at a 20:1 ratio until the stepper sensor 23 senses the first step target 24. Once this occurs, a sensor signal disengages the azimuth clutch 30b and engages the azimuth brake 30a. Simultaneously therewith, the program stepper clutch 26 is disengaged resulting in the stepper sensor arm 22 returning to the home position by means of a bias air cylinder 25. The action of stepper sensor arm 22 activates a micro-switch 22d resetting the logic of the circuitry at the completion of the revolution of the tire.

This operation is continued throughout the entire series of wraps with the tire 10 continuing to spin until it completes the next revolution to thereafter actuate the spin switch 18a. The sequence repeats itself at the same step distance until the zone sensor 17 senses a second target 27 which signals a holding device, i.e., a ratchet or one way clutch, allowing the stepper sensor 23 to advance to the next zone. The aforementioned continues until a fresh zone target 24 is sensed at which time the sequence proceeds as above.

In conclusion, the program assembly 15, including the zone sensor 17 and stepper sensor 23 are driven by an azimuth drive system 12 employing a plurality of cables 14 and gears 29, 16. The zone sensor 17 moves in proportion to the motion of the sensor arm 22 on the expanded scale seen in FIG. 1. The stepper sensor 23 also moves in concert with the azimuth drive system 12 but is returned to the home position after each step that the program assembly 15 makes. Such program assembly 15 moves until the stepper sensor 23 passes under a metal target 27 of template 20. The signal from the sensor 23 causes the logic of the control circuitry to release a holding device and apply a brake in the azimuth arm assembly 12. When the zone sensor 17 detects a target 27, a signal is sent to the stepper sensor 23 to move to the next inside scale of a, b, c, d, e. The stepper sensor 23 moves through successive zones until the last target is sensed.

The total programming operation employing only one template, program template 20, is repeated until the last zone target 27 is sensed by the zone sensor 17. When this occurs, the holding device in the program arm assembly 22 moves all the way to cause a stop sequence to be initiated and the tire program is completed.

The program template 20 is designed to have a 280° arc marked off into 14° increments. The outer scale 19 is marked off into degrees at a 2:1 ratio; which means that the 280° arc is divided into 140° with + 70° to 0. For programming purposes, the designated zone targets 27 are positioned at the outer scale 19 while the individual steps are identified by targets 24 on the five inner scales *a, b, c, d, e.* As mentioned above, each of the five inner scales represents the size of the steps to be made between wraps in each of the five zones.

TRANSFER OF INFORMATION FROM PROGRAM TO PRODUCTION TEMPLATE

In practice, information is transferred from the program template 20 to the production template 13 in the following manner.

1. The programmer assembly 4 is set into a programming mode, as heretofore explained in detail, by disconnecting sensor arm 22 from azimuth arm 18 through disengagement of sensor latch 22*b* and actuation of microswitch 22*c*. At the same time, the extruder 1 is deenergized so that the tire mounting hub and drive assembly 3 and program assembly 4 (FIG. 4) operate without the rubber applicator assembly 2 feeding rubber. The program template 20 is now positioned in the upper portion of programmer assembly 4.

2. The mounting hub and drive assembly 3, as well as programmer assembly 4, are energized starting the operational cycle. With a grease pencil or the like, the operator-programmer marks the transparent program template 20 about its periphery in accordance with the respective positions taken by the zone sensor 17. Each position of sensor 17 about a given point of the periphery template of 20 represents the position of an individual wrap of rubber ribbon on the tire casing 10.

3. Next, after a complete cycle, whereby the zone sensor 17 has returned to its home position, the programming template 20 is removed from the console.

4. A blank, transparent production template 13 is next placed on the back side of the removed program template 20 and both are locked together through appropriate locating means, i.e. notches (FIG. 5). By doing this, it is possible to always maintain a fixed relationship between the respective templates 13 and 20, as well as between the templates and the zone sensor 17, to assure repeatability of the rubber wrapping operation once the production template 13 is mounted for operation.

Figure 6:
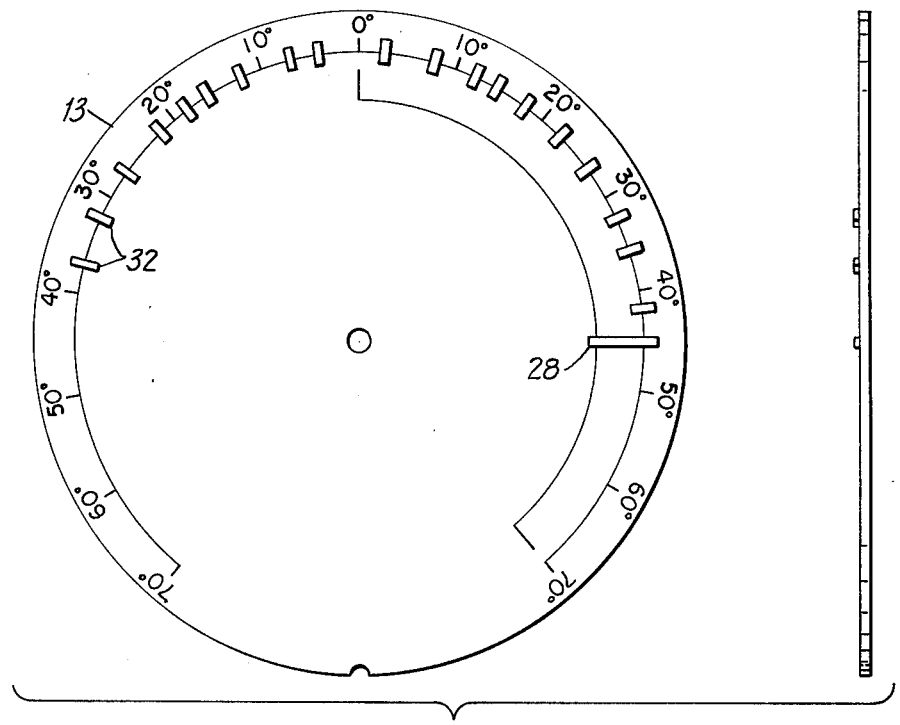
FIG. 6 is a front view of a production template.

5. Lastly, the positions from the programming template 20 are transferred to the production 13 and identified by an individual metallic sensing means 32 (tape) about ¾ inch in length positioned to correspond to each grease mark previously made on the programming template 20 (see FIG. 6).

As can be understood from the above, the use of two templates 13, 20 is intended for programming only, with a final production template 13 (FIG. 6) being the sole template employed in the manufacturing operation. With this simple and effective approach to programming, there is no need for the internal storage of program information and its associated circuitry.

Various die sizes are obtainable by changing the various zone sizes and length of steps within the zones on template 20. Once a predetermined sequence or program is obtained, the position for each step is recorded. From this information the permanent production template 13 is developed which is provided with a series of metallic sensing means 32 which serve as actuators for the sensors and identify the position of each step.

In accordance with the present invention, we have described and illustrated the preferred embodiment of the invention, but it will be understood that various changes and modifications can be made therein without departing from the spirit of the invention as defined by the appended claims.

What we claim:

1. A programming assembly for use with a tire retread apparatus adapted to control the wraps of advancing rubber ribbon material as it is applied upon a tire surface supported on tire support means provided with spindle means for receiving a tire thereon, drive means for driving said spindle means through a linkage means connected between said drive means and said spindle means, said linkage means being directed by said program assembly for operation during each of two separate modes of operation, each of said modes of operation employing individual templates, wherein: said linkage means being moveable in a program mode in response to program information set forth on a transportable, programable template by means of a series of targets positioned in respective arcuate paths formed on said first template, the distance between each of said targets corresponding to a portion of said tire surface to be wrapped with rubber ribbon, to thusly define a ribbon wrap formation across the entire tire tread surface; a first sensing means mounted on movable support means within said tire retread apparatus, being adapted to travel in an arcuate path in concert with said linkage means, and being actuable by each of said targets for causing corresponding arcuate movement of said tire surface; a second sensing means mounted in proximity to said first sensing means on said support means being engageable therewith through actuation of switch means after the last of said targets in said programable template has been sensed; said first and second sensing means being jointly movable in response to a plurality of contacts disposed in a predefined arcuate path about a transportable production template disposed in said programming assembly to thereby enable said programming assembly to function in said second mode once information from said first template has been transferred to said second template to thusly control the arcuate movement of said tire surface in an incrementable fashion through said linkage means in response to said transferred information from said production template, and means for de-energizing said spindle after all of said contacts on said second template have been sensed.

2. An apparatus as claimed in claim 1, wherein: said linkage assembly is provided with an azimuth arm for moving said tire surface in response to a program information displayed on each of said templates, said azimuth arm being connected to said sensing means, whereby for every arcuate degree of movement said sensing means there is a corresponding two arcuate degree movement by said azimuth arm.

3. An apparatus as claimed in claim 1, wherein: said first and said second sensing means are movably mounted on support means; said support means being connectably related to said azimuth arm for relative movement by said sensing means with respect said azimuth arm; and switch means mounted on said support means for energizing said sensing means to sense said targets on each of said templates until said support means is engaged by brake means mounted in proximity thereto for halting the movement of said azimuth arm through engagement with said support means.

4. An apparatus as claimed in claim 1, wherein: said templates being transparent and further defined respectively by a program template and a production template; each of said templates being respectively employed, one at a time, for controlling the deposition of rubber ribbon upon a tire surface moving in an arcuate direction, said program template being employed to define the zones of said tire surface to be wrapped in response to electrical sensing means sensing a plurality of targets mounted in arcuate concentric paths of said program template, each of said paths corresponding to a portion of the tire surface to receive rubber ribbon; said production template being defined by an indexed arcuate scale adapted to receive thereon information transferred from said program template, for defining the final tire surface profile to be formed through the incremental movement of said tire surface during rubber ribbon deposition in accordance with position of said contacts on said production template.

5. An apparatus as claimed in claim 3, including: a brake and clutch assembly mounted in proximity to said support means for engagement and disengagement with said support means, whereby actuation of said first sensing means by a last target on said program template, causes said brake to engage and thereby halt the movement of said azimuth arm until such time as switch means disengages said brake to enable continued advancement of said first and second sensing means in cooperation with said contacts on said production template, until a last contact on said production template is sensed, at which point said tire spindle is de-energized and ribbon is no longer fed in the direction of said tire surface.

6. An apparatus as claimed in claim 1, wherein: said second sensing means is a zone stepper sensing means adapted to move 20 arcuate degrees for each degree of tire movement during said second mode.

7. An apparatus as claimed in claim 3, wherein: said first and said second sensing means are caused to successively move in a 2:1 relationship with respect to said azimuth arm as said sensing means is advanced to sense the next successive target on said programable template, until complete rotation of said tire takes place at which time said azimuth arm de-energizes.

8. An apparatus as claimed in claim 4, wherein: said program template is provided with a plurality of movable zone targets positionable in a first outer path defined by an arcuate scale, each position of said respective targets defining a zone transitional point for programming the motion of said tire consistent with a specified tire contour; and a plurality of concentrically disposed arcuate paths spaced from said first outer path, each of said paths being provided with a positionable target for establishing the distance said tire is advanced for a given zone.

* * * * *